United States Patent [19]

Wolfe

[11] 4,172,747
[45] Oct. 30, 1979

[54] METHOD OF RETREADING OR REPAIRING TIRES

[75] Inventor: Merritt W. Wolfe, Akron, Ohio

[73] Assignee: The Goodyear Tire & Rubber Company, Akron, Ohio

[21] Appl. No.: 900,431

[22] Filed: Apr. 27, 1978

Related U.S. Application Data

[60] Continuation of Ser. No. 760,794, Jan. 19, 1977, abandoned, which is a division of Ser. No. 705,381, Jul. 15, 1976, Pat. No. 4,028,168.

[51] Int. Cl.² .............................................. B29H 5/04
[52] U.S. Cl. ......................................... 156/96; 34/47; 34/104; 432/225; 422/200
[58] Field of Search .............. 156/96, 394 R, 394 FM, 156/126–129; 425/18, 34 A, 40, 22, 30, 29, 23; 34/104–106, 47; 23/290, 291; 432/225

[56] References Cited

U.S. PATENT DOCUMENTS

| | | | |
|---|---|---|---|
| 1,420,371 | 6/1922 | Emmons | 34/104 |
| 1,643,196 | 9/1927 | Brown | 425/34 A |
| 2,014,010 | 9/1935 | Wheatley | 425/18 |
| 2,989,779 | 6/1961 | White | 425/23 |
| 3,475,828 | 11/1969 | Feldman et al. | 34/104 |
| 3,884,739 | 5/1975 | Hindin et al. | 156/96 |
| 3,917,440 | 11/1975 | Huebert | 425/18 |
| 3,920,498 | 11/1975 | Everhardt et al. | 156/96 |
| 3,926,711 | 12/1975 | Wolfe | 156/96 |
| 3,951,720 | 4/1976 | Brodie | 156/96 |

OTHER PUBLICATIONS

Bulletin of Vulcan Equipment Company, Ltd. on Model 45, Treadbonder, (2 pp.), Toronto, Canada.

Primary Examiner—John E. Kittle
Attorney, Agent, or Firm—Frederick K. Lacher; R. S. Washburn

[57] ABSTRACT

A kettle having a chamber sealed from the ambient atmosphere and designed to receive a plurality of tires retreaded with precured treads. Steam and air are supplied to the chamber in such a way that they are thoroughly mixed within the chamber to eliminate any hot or cold spots previously encountered in devices wherein the steam and air are each supplied to the chamber through a single inlet.

5 Claims, 5 Drawing Figures

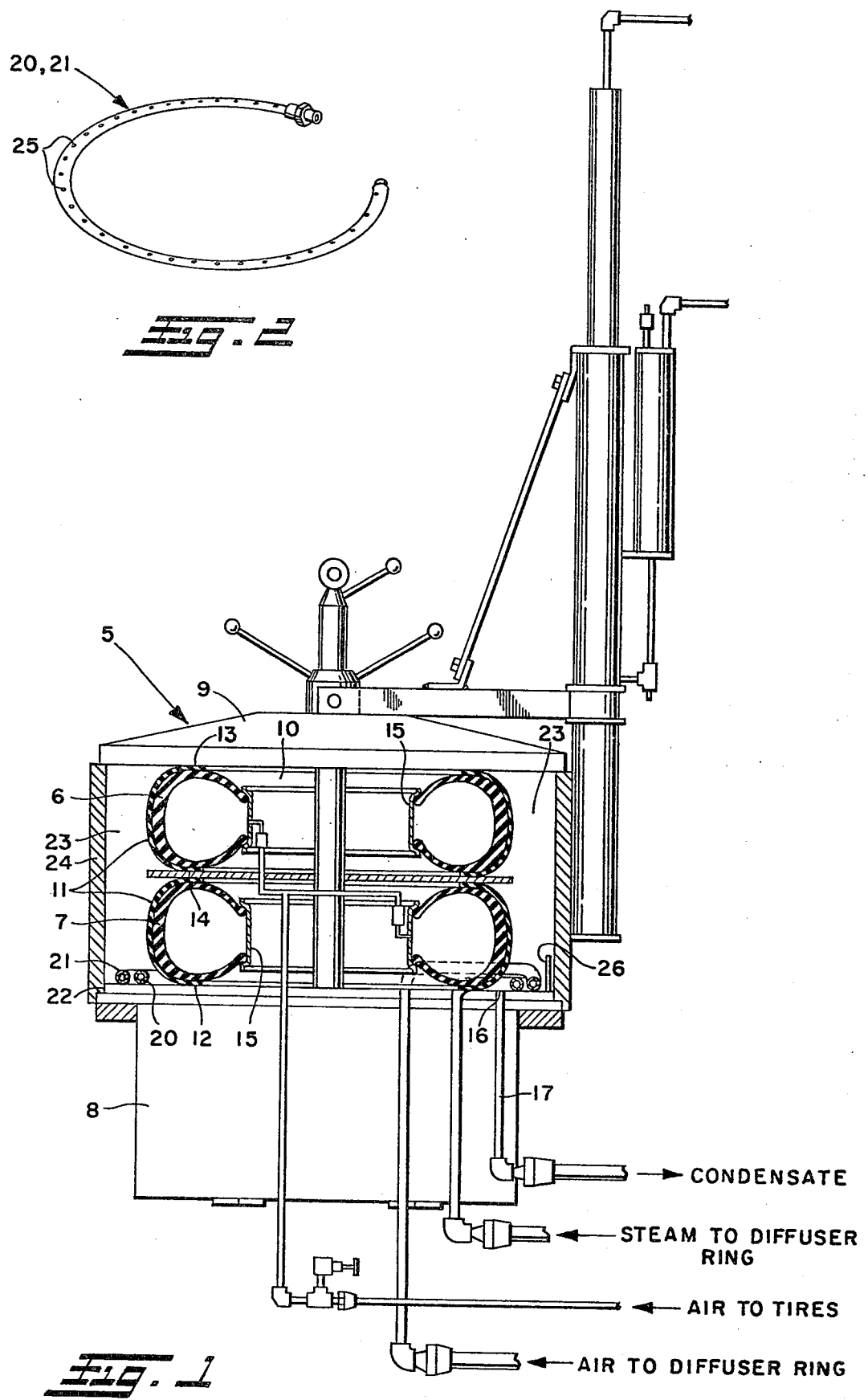

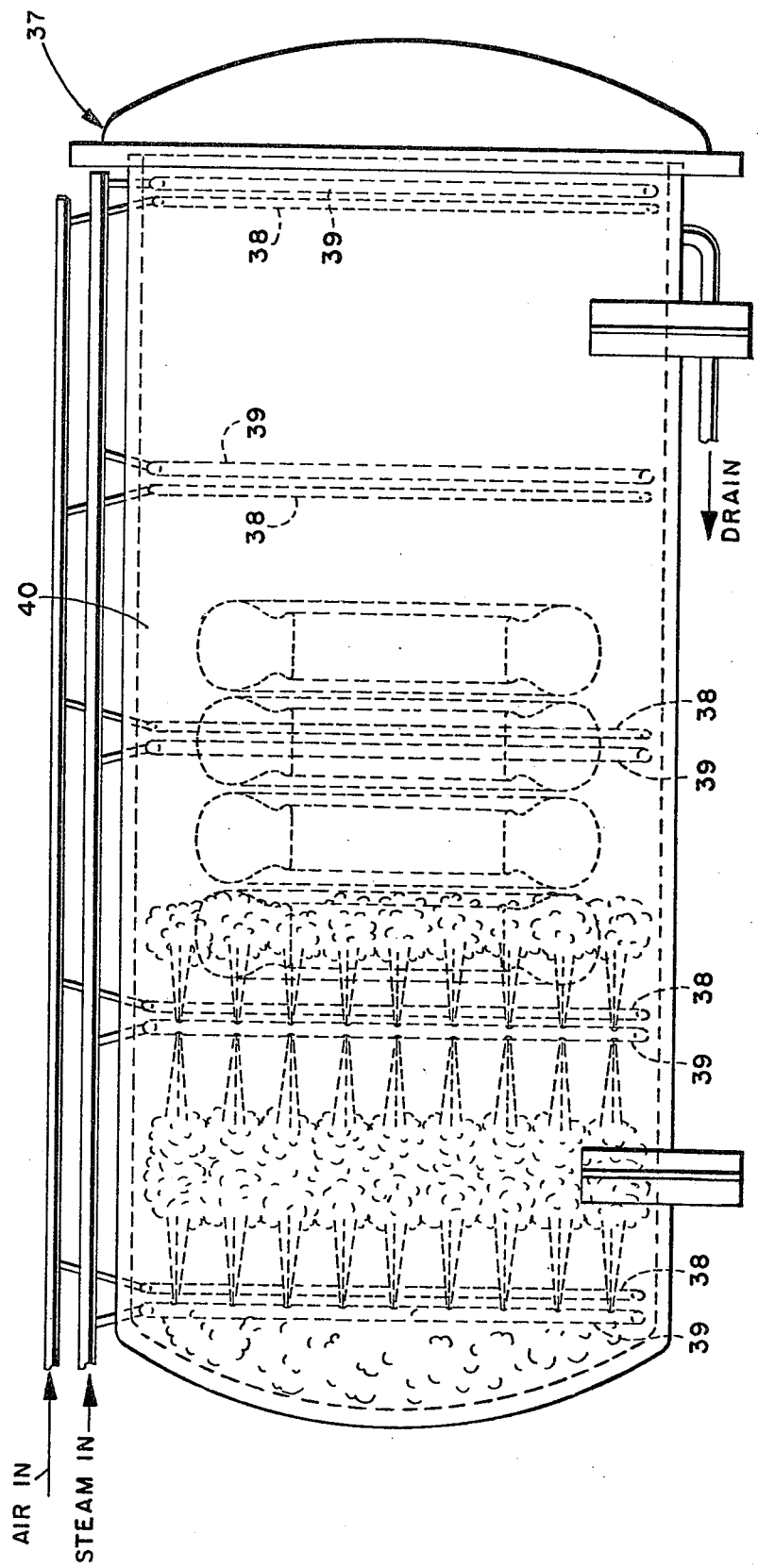

METHOD OF RETREADING OR REPAIRING TIRES

This is a continuation of application Ser. No. 760,794 filed Jan. 19, 1977, now abandoned, which is a division of application Ser. No. 705,381 filed July 15, 1976, now U.S. Pat. No. 4,028,168.

BACKGROUND OF THE INVENTION

The invention is particularly designed for kettles capable of accommodating a very large tire, or a plurality of smaller tires being repaired or retreaded, especially kettles in which a combination of steam and air, under pressure, are utilized in the heating and vulcanization of any vulcanizable material of the tire disposed within the kettle. Known prior art kettles have single inlets or several very widely spaced inlets through which the steam and air are admitted into the kettles. It is desirable to obtain a uniform mixture of air and steam within the chamber of the kettle to eliminate hot and cold spots within the kettle. Such spots have been tolerated in prior devices and overcome by rotating the tires within the kettle such that every portion of the tire passes through the same heat or temperature gradient, or by the use of blowers or fans to circulate the mixture of steam and air more evenly throughout the kettle. These systems have many disadvantages. For example, the rotation of large earthmover-type tires, can, in some cases, cause a breakdown of the bead areas of the tire. The invention is directed to the provision of a highly improved kettle and means for obtaining a uniform mixture of steam and air within the kettle.

Briefly stated, the invention is in a kettle used in the retreading and repair of tires. The kettle comprises a plurality of parts which, when brought together, form a chamber which is sealed from the ambient atmosphere. Means are provided for simultaneously circulating steam and air, under pressure, within the chamber when it is sealed. Such means include multiple inlets in the chamber for both the steam and air, the inlets of the steam being sufficiently close to those of the air to produce a more nearly uniform mixture of steam and air within the chamber.

DESCRIPTION OF THE DRAWING

The following description of the invention will be better understood by having reference to the annexed drawing, wherein:

FIG. 1 is a side view of a kettle with the top portion of the kettle shown in section to show the invention and the tires positioned within the kettle;

FIG. 2 is a perspective view of a diffuser ring for dispersing air and steam within the kettles;

FIG. 5 is a side view of a horizontally disposed kettle which utilizes a number of spaced, vertically disposed diffuser rings.

ENVIRONMENT OF THE INVENTION

Figure 3:
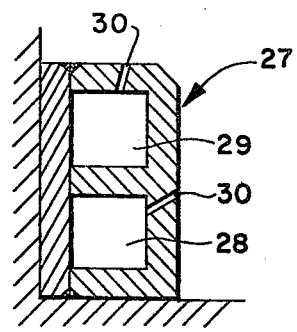
FIG. 3 is an enlarged section of a differently configured diffuser ring for distributing air and steam within the kettle.

With particular reference to FIGS. 1 and 2, there is shown a kettle 5 for receiving retreaded or repaired tires; e.g. tires 6,7 which are each retreaded with a previously molded and vulcanized tread. The kettle 5 is of any suitable design, such as the Treadbonder curing device or kettle manufactured by the Vulcan Equipment Company, Ltd. of Toronto, Canada. Such a kettle 5 essentially comprises a base 8 on which the retreaded tires 6,7 are vertically stacked in horizontal relation, and a top cap or cover 9 which is movable into and out of sealing engagement with the base 8 and with the base 8 forms a chamber 10 which is sealed from the ambient atmosphere. The top cap 9 surrounds the retreaded tires 6,7 stacked within the sealed chamber 10.

A rubber envelope 11 covers the precured tread and bonding layer and extends over the sidewalls of the retreaded tires 6,7.

The base 8 and top cap 9 of the kettle 5 are provided with sealing rings 12,13. A third sealing ring 14 is provided between the retreaded tires 6,7 and acts as a spacer for them. The top cap 9, as it is moved into sealing engagement with the base 8, forces the sealing rings 12-14 against the rubber envelopes 11 which, in turn, compressively engage the sidewalls of the tire to form a seal therebetween, whereby the bonding layer between the tread and tire casing is sealed from the ambient atmosphere and mixture of steam and air, under pressure. The retreaded tires 6,7 are each mounted on a curing-type wheel rim 15 and inflated to a desired pressure during the subsequent heating and curing of the bonding layer, whereby the precured treads are permanently secured to the tire casings. A fluid outlet 16 is provided in the base 8 and coupled to a drain pipe 17 through which condensate of steam is removed from within the chamber 10.

THE INVENTION

For convenience and economy of operation and construction, a pair of diffuser rings 20,21 are annularly disposed on the base 8 in side-by-side relation concentrically about the center or longitudinal axis of the base 8, since the diffuser rings 20,21 could also be carried by the top cap 9 or intermediate spacer ring 14. The diffuser rings 20,21 are positioned adjacent the outer periphery 22 of the base 8 within the annular, doughnut-shaped space 23 formed between the retreaded tires 6,7 and adjacent cylindrical wall 24 of the top can 9 of the kettle 5. The inner and outer diffuser rings 20,21, respectively, are designed to receive steam and air, under pressure, from a source of supply (not shown). The individual diffuser rings 20,21, as best seen in FIG. 2, are each provided with a number of spaced openings or fluid inlets 25 for directing jets of steam and air into the annular space 23 adjacent the outer peripheries of the retreaded tires 6,7. Any suitable temperature sensing probe 26 is provided for monitoring the temperature within the chamber 10 and controlling the input of steam into the kettle 5 to maintain the temperature within the annular space 23 in the preferred range of from 200° F. to 325° F. It was found that the use of the diffuser rings 20,21, rather than single inlets for the steam and air, reduced the temperature differential within the annular space 23 from 50° F., at a curing temperature of 220° F., to about 5° F. which is highly desirable to maintain more nearly uniform curing temperatures which effect more efficient vulcanization of the vulcanizable components of the tire within the kettle 5, espcially at curing temperatures below 212° F. where steam and air, under pressure, are used as the curing medium. Such cures have been effected with a mixture of steam and air at a temperature of about 200° F.

An integral diffuser ring 27 containing both steam and air, is illustrated in FIG. 3. This type diffuser ring 27 is provided with a pair of separated channels or conduits 28,29 through which steam and air, under pressure, are circulated. The steam and air conduits 28,29 are each provided with a number of spaced openings or fluid inlets 30 for directing the jets of steam and air into the chamber 10 of the kettle 5, as previously described. The longitudinal axes of the fluid inlets 30 of the steam conduit 29 may be disposed at greater angles to the center or longitudinal axis of the kettle 5 than those of the air conduit 29, depending on the location or orientation of the conduits 28,29; i.e. whether they are vertically stacked or side-by-side in a horizontal plane.

Figure 4:
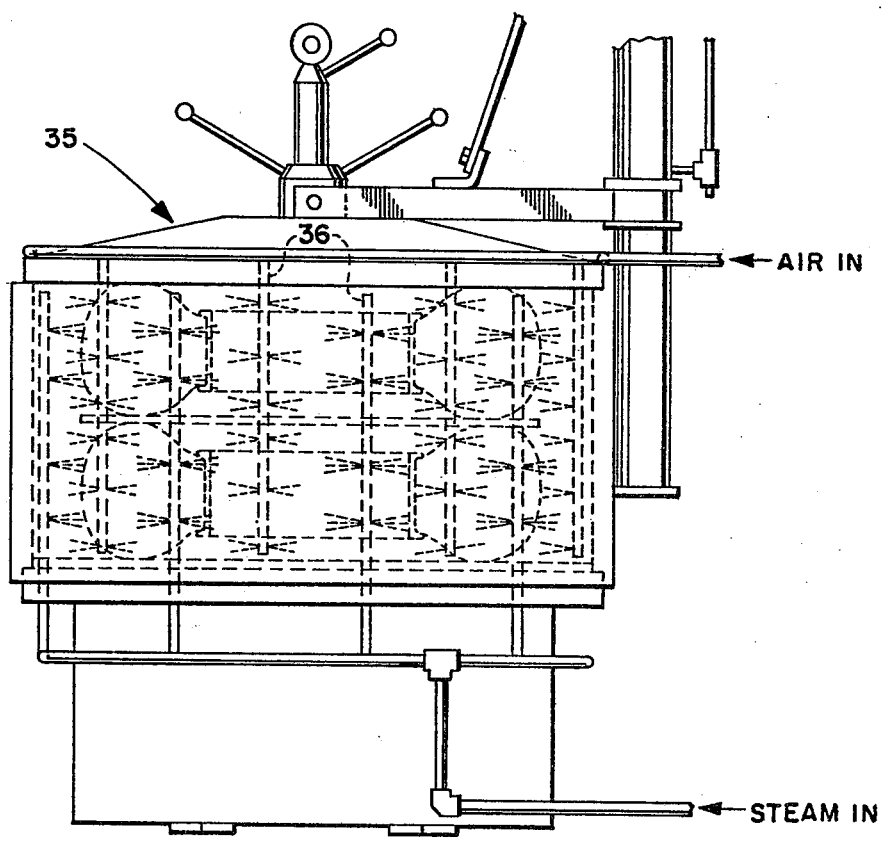
FIG. 4 is a side view of the kettle of FIG. 1 with a different arrangement for distributing air and steam within the kettle.

The kettle 35 of FIG. 4 is essentially that of FIG. 1, except that the diffuser rings for distributing the steam and air within the sealed chamber 10 are not circular rings, but straight, diffuser pipes 36 which extend longitudinally of the kettle 35; i.e. they extend parallel to the longitudinal axis of the kettle 35. The diffuser pipes 36 are equally, angularly spaced about the longitudinal axis of the kettle 35 adjacent the cylindrical walls of the kettle 35. It should be apparent that the diffuser pipes 36 can be individual pipes 36 like the individual diffuser rings 20,21 of FIG. 2, or a single composite pipe with separated conduits for the steam and air like the diffuser rings 20,21 of FIG. 3. In any case, it is important to keep the air inlets sufficiently close to the steam inlets to obtain a uniform mixture of steam and air within the sealed chamber of the kettle. Thus, there can be innumerable combinations for locating the air inlets in close proximity to the steam inlets, depending on the size, shape, and location of the kettle. For example, the kettle 37 of FIG. 5 is horizontally elongated, as distinguished from the vertically elongated kettles of FIGS. 1 and 4. Because of the size and length of the kettle 37, a number of pairs of vertically disposed diffuser rings 38,39 for steam and air, are spaced longitudinally within the chamber 40 of the kettle 37. The diffuser rings 38,39 can be of either of the aforementioned designs, or longitudinal extending diffuser pipes, rather than rings, and provided on the cylindrical walls of the kettle 37. Again, the important criteria being the positioning of the fluid inlets for the steam and air to obtain the best possible mixture of steam and air and consequent uniform temperature within the kettle.

Thus, there has been described a kettle which employs a novel mechanism for obtaining a more nearly uniform mixture of steam and air, under pressure, within the sealed chamber of the kettle, thereby eliminating or substantially reducing hot and cold spots which normally occur within the chamber when single and not multiple inlets for the steam and air are utilized.

I claim:

1. A method of renewing a tire with a previously molded and vulcanized tread element, such as a precured tread or lug, and a bonding layer interposed between said tread element and the tire casing comprising the steps of directing jets of air and steam from a number of separate closely spaced air and steam inlets positioned around the tire into the surrounding space adjacent the renewed tire and said tread element mounted thereon to provide a uniform mixture of steam and air, and circulating said mixture of steam and air by said jets of air and steam, under pressure, in said space at the curing temperature of said bonding layer.

2. The method of claim 1, which includes at least covering the tread element with an elastic, fluid impervious membrane, prior to circulating said mixture in said space adjacent the tire and element.

3. The method of claim 2, wherein the mixture of steam and air is circulated at a temperature in the range of from 200° F. to 212° F.

4. The method of claim 1 wherein said curing temperature is in the range of from about 200° F. to 212° F.

5. The method of claim 1 wherein said curing temperature is less than 212° F.

* * * * *